(12) United States Patent
Saxena et al.

(10) Patent No.: US 8,881,224 B2
(45) Date of Patent: Nov. 4, 2014

(54) METHOD AND SYSTEM FOR PROVIDING MASKING SERVICES

(75) Inventors: Ashutosh Saxena, Gujarat (IN); Vishal Krishna Saxena, Uttar Pradesh (IN); Kaushal Saxena, Rajasthan (IN); Surni Kumar, Tamil Nadu (IN); Mithun Paul, Kerala (IN)

(73) Assignee: Infosys Limited (IN)

( * ) Notice: Subject to any disclaimer, the term of this patent is extended or adjusted under 35 U.S.C. 154(b) by 453 days.

(21) Appl. No.: 12/901,769

(22) Filed: Oct. 11, 2010

(65) Prior Publication Data

US 2011/0321120 A1 Dec. 29, 2011

(30) Foreign Application Priority Data

Jun. 24, 2010 (IN) .......................... 1785/CHE/2010

(51) Int. Cl.
```
G06F 17/00     (2006.01)
G06F 7/04      (2006.01)
G06F 12/14     (2006.01)
H04L 29/06     (2006.01)
H04L 9/32      (2006.01)
G06F 21/00     (2013.01)
G06F 21/62     (2013.01)
G06F 21/10     (2013.01)
G06F 21/31     (2013.01)
```
(52) U.S. Cl.
CPC ............ *G06F 21/6245* (2013.01); *G06F 21/10* (2013.01); *G06F 2221/2107* (2013.01); *G06F 21/6209* (2013.01); *H04L 63/105* (2013.01); *H04L 63/083* (2013.01); *G06F 21/6218* (2013.01); *G06F 2221/2113* (2013.01); *H04L 63/0428* (2013.01); *H04L 63/20* (2013.01); *H04L 63/08* (2013.01); *G06F 21/31* (2013.01)

USPC ............ 726/1; 726/4; 726/5; 726/22; 726/27; 713/165; 713/166; 713/168; 713/182

(58) Field of Classification Search
CPC ....... H04L 63/20; H04L 63/105; H04L 63/08; H04L 63/083; H04L 63/0428; G06F 21/6218; G06F 21/31; G06F 21/10; G06F 2221/2107; G06F 21/6209; G06F 2221/2113
USPC .......... 726/1, 4, 5, 22, 27; 713/165, 166, 168, 713/182
See application file for complete search history.

(56) References Cited

U.S. PATENT DOCUMENTS

| | | | |
|---|---|---|---|
| 2006/0265375 A1* | 11/2006 | Hess | 707/9 |
| 2007/0150964 A1* | 6/2007 | Orthlieb et al. | 726/27 |
| 2007/0299881 A1* | 12/2007 | Bouganim | 707/200 |
| 2009/0048997 A1* | 2/2009 | Manickam et al. | 706/47 |
| 2009/0100527 A1* | 4/2009 | Booth et al. | 726/27 |
| 2010/0023750 A1* | 1/2010 | Tan | 713/150 |

* cited by examiner

*Primary Examiner* — Aravind Moorthy
(74) *Attorney, Agent, or Firm* — Cantor Colburn LLP

(57) ABSTRACT

A system and method for presenting on-demand masking of data as a software service in a distributed environment is provided. An application hosted on a computing device receives request for access to application data from a user. Credentials of the user are first validated in order to determine whether the user is authorized to access the requested application data. For an authorized user, a category of the user is determined to ascertain whether the user is privileged to obtain full access. In case the user is a privileged user, unmasked application data is fetched from a database utility and provided to the user. In case the user is not a privileged user, application data access request is transferred to a data masking service. Application data is fetched from database utility, masked based on pre-defined masking rules and provided to the user.

26 Claims, 3 Drawing Sheets

METHOD AND SYSTEM FOR PROVIDING MASKING SERVICES

FIELD OF INVENTION

The present invention relates generally to the field of data masking. More particularly, the present invention implements on-demand masking of data offered as a software service in a distributed environment and extensible to a cloud environment.

BACKGROUND OF THE INVENTION

Globalization of business processes as well as advancements in Information Technology have resulted in extensive use of computer based information systems for transmitting and retrieving business related data across physical locations. IT services now enable organizations to manage data across various offices located around the world. Organizations are now able to share customer data with each other without being restricted by geographical boundaries. Further, business needs have driven organizations to resort to outsourcing of certain business services for increasing productivity and efficiency. Outsourcing of business services may entail outsourcing consumer data to foreign countries. As a result of extensive sharing of customer data both within and outside organizations for various purposes, data privacy has become a prime concern for businesses involved in handling sensitive customer data.

Countries around the world are developing regulations designed to support confidentiality. Legislations are being passed insisting that companies outsourcing consumer data to foreign countries assume responsibility for the data. To address the issues of data privacy, various techniques such as Anonymization, Randomization, Perturbation, Cryptographic Approach, Privacy Policy Languages and Data Masking are frequently used in the industry. However, the aforementioned techniques are dependant on type of operating system/software platform or software language in which the customer data has been implemented. Commonly used data masking techniques implemented for maintaining customer privacy involve tasks such as explicitly setting up distinct software environments for masking data pertaining to different operating systems/software platforms.

Commonly used data masking solutions in the industry include offering data masking as a static software solution in the form of a standalone product. Organizations using standalone data masking products have to take care of issues such as deployment of the software product by creating software installers and integrating the product with business processes already in operation. These issues may thereby involve high developmental cost and use of special hardware. Moreover, usage of such a product may include implementing operations for scheduling backups and disaster recovery. Since a data masking software product is physically installed in the software system of an organization using the product, it may face a threat of physical access by unauthorized persons. Also, regular updates or bug fixes become cumbersome, as the standalone product is tightly integrated with other organizational processes. Further, there may be scenarios where use of data masking solution is very minimal involving access by a single application for a limited period of time. In such a case, deployment of a standalone product is a significant overhead for an organization.

In light of the above, there exists a need for a data masking solution that offers real time on-demand masking while maintaining data privacy.

SUMMARY OF THE INVENTION

A method and system for providing on-demand data masking as a software service is provided. The method includes receiving request by a hosted software application for access to application data. Application data may be requested by a user. In various embodiments of the present invention, the user may be a human user, a software program or an automated machine. Credentials of user requesting the application are first validated by the application. Validation is performed to determine whether the user is authorized to access the requested application data. Upon successful determination of user validity, requested application data is provided to the user. In case user validity is not determined, the user is provided with very limited access to application.

In various embodiments of the present invention, for the purpose of providing application data to user, firstly type of user is determined based on user credentials. The requesting user may be a privileged or a non-privileged user. In case the user is a privileged user, application data stored in a database utility is fetched and unmasked data is provided to the user. In case the user is not a privileged user, application data access request is transferred by the application to a subscribed data masking service. The masking service fetches application data from the database utility, masks the data based on pre-configured masking rules and provides masked data to the application. Subscribing to data masking service comprises executing Software as a Service agreement between the application owner and the masking services provider.

In an embodiment of the present invention, masking rules are configured by an application owner managing the application. Configuration of masking rules is performed by integrating subscribed data masking service with the application after subscribing to the data masking service by the application owner. Configuring masking rules comprises specifying data masking options such as specifying data to be masked for an application and type of masking to be performed.

In various embodiments of the present invention, application hosted by the application owner, masking service provided by the masking services provider and storage services provided by the database utility are implemented on independent software environments connected through one or more communication networks.

The method and system of the present invention provides an application owner hosting an application with means to subscribe to data masking service hosted by a masking service provider. In an embodiment of the present invention, a masking service provider receives request for subscription to data masking service from an application owner hosting a software application. The Masking Services Provider authenticates credentials of the application owner. For facilitating subscription of data masking service, one or more masking rules corresponding to the software application are configured by the application owner. The Masking Services Provider facilitates configuration of one or more masking rules by providing a set of user interfaces to the application owner for specifying options for configuring masking rules.

In an embodiment of the present invention, after having subscribed to a data masking service, the Masking Services Provider receives request for performing data masking on data associated with the software application. Based on the request received, one or more data masking algorithms are executed for performing data masking according to the one or more masking rules. The one or more data masking algorithms include algorithms for masking at least one of alphabetical data, numerical data, data comprising combination of alphabets and numerals, data comprising unique codes or any combination thereof.

In an embodiment of the present invention, a masking service is implemented in the form of a source program. In another embodiment of the present invention, the masking service is implemented in the form of an object program.

A system for provisioning application data in secure form to a requesting user is provided. The system comprises a computing device which is part of an organization providing one or more applications to requesting users and configured to host software application requested by a user. The user is operationally connected to the computing device through a communication network. The system further comprises a credential check module configured to validate credentials of the user requesting application data and a subscription module configured to manage subscription of one or more applications requesting access to the one or more data masking services. In an embodiment of the present invention, the subscription module is incorporated as part of the masking services provider. For performing data masking, the system of the invention comprises a masking services provider operationally connected to the computing device and configured to perform masking of data and provide one or more data masking services. The system of the invention also comprises a database utility operationally connected to the computing device and data masking services provider, and configured to store data associated with the software application.

In an embodiment of the present invention, the computing device hosting the software application is part of a software vendor configured to provide one or more applications and to host the software application. The software vendor may be internal or external to the organization.

In an embodiment of the present invention, the credential check module validates user credentials by determining whether a user is authorized to access a requested software application. The credential check module is further configured to determine category of user and to take appropriate action based on the determination. If the user is a privileged user, the credential check module fetches application data from database utility and provides the data to the software application. However, if the user is an unprivileged user, the credential check module transfers application data request to Masking Services Provider.

In various embodiments of the present invention, the Masking Service Provider includes one or more application servers configured to execute multiple instances of data masking algorithms. The Masking Services Provider further includes a rules engine configured to store software instructions for implementing data masking rules during execution of data masking process.

In an embodiment of the present invention, the Masking Services Provider regularly updates masking rules based on requirements by application owners.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
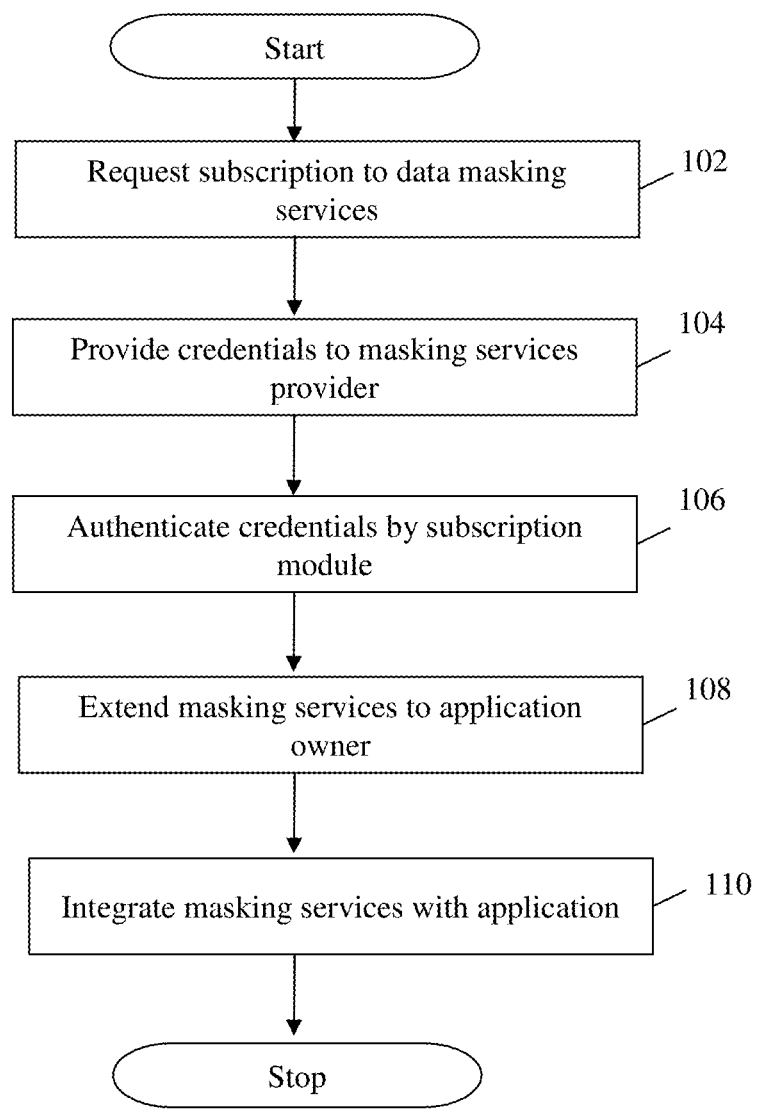
FIG. 1 is a flowchart illustrating a method for providing a data masking service subscription to an application, in accordance with an embodiment of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

Exemplary embodiments of the methods, systems and computer program products described herein provide data masking applications as real time software services to end users. In various embodiments of the present invention, an application owner can connect to a computer network such as the Internet and can subscribe to one or more data masking services provided by a Masking Services Provider. In exemplary embodiments of the present invention, the application owner integrates the one or more services into his application and hosts the application on a computer system. Further, an end user may be provided with a data masking service through the application hosted by the application owner. In exemplary embodiments of the present invention, software maintenance activities and upgrades to masking service applications are performed by the masking services provider, thereby annulling the need for end users to download and install patches/upgrades to the application.

In exemplary embodiments of the present invention, methods, systems and computer program products described herein receive request for application data from an end user who has been authenticated by the application. Authentication is performed in order to determine whether the user is authorized to access sensitive data. In an embodiment of the present invention, once the authentication is successful, raw data is retrieved from data storage operationally connected to a hosted application and data masking is performed on the raw data by a software service subscribed to by the application owner. Rather than obligating an application owner to purchase entire data masking solution, the system of the present invention offers data masking as a software service that can be used dynamically. This obviates the need to buy a dedicated license/entire product suite, thereby resulting in cost savings for an application owner needing to use a small level of masking service for a limited amount of time. The end user requesting application data may be a client such as a human user, a software program, an automated machine etc.

The present invention would now be discussed in context of embodiments as illustrated in the accompanying drawings.

FIG. 1 is a flowchart illustrating method steps for providing a data masking service subscription to an application, in accordance with an embodiment of the present invention. The system and method of the present invention utilizes an approach of providing data masking as Software as a Service (SaaS) application in a "cloud computing" environment and/or in a distributed environment. A SaaS application is a software delivery model wherein a software application is delivered as a service to multiple clients. Typically, a software vendor owns and maintains the required hardware and software to provide the service. The software vendor provides the service to users on a subscription basis, i.e. users can pay a subscription fee for the software, which runs on the software vendor's server. In an embodiment of the present invention, the data masking software service is provided by a Masking Services Provider.

Customer-centric organizations such as Banks, Financial Institutions, Utility service providers employ various applications that include using and sharing sensitive customer data. One or more end users may request access to application data containing sensitive customer information. Typically, end users may be located within or external to the organization. In various embodiments of the present invention, in order to provide access to applications without compromising data integrity, application data is masked. In exemplary embodiments of the present invention, an application owner is connected to a Masking services Provider through a communication network and subscribes to Data Masking services offered by the Masking services Provider. For the purpose of subscribing to Data Masking Services, an application owner employs the following steps. As illustrated in the figure, at step 102, an application owner sends a request for subscription to one or more masking applications through a communication network. A typical data masking service may include a data masking algorithm implementation for masking specific type of data. In an embodiment of the present invention, the subscription request is sent to a Data Masking Services Provider. The subscription request includes providing options for implementing type of data masking. Examples of types of data masking offered as services by the Data Masking Services Provider include, but are not limited to, algorithms for masking one or more of alphabetical data, numerical data, data comprising combination of alphabets and numerals, data comprising unique codes including special characters etc. Further, the subscription request may include specifying level and degree of data masking associated with the request, for example, degree of shuffling to be implemented for a data masking service. As part of the subscription request, at step 104, the application owner submits its credentials to the Masking Services Provider. Examples of credentials include username, password, IP address of request originating computer etc. Before providing one or more masking services to the application owner, credentials provided by the application owner are authenticated by a subscription module at step 106. The credentials of application owner may be authenticated using authentication systems such as Single Sign On (SSO) or Windows Domain System.

At step 108, the one or more masking services are extended to the application owner. For the purposes of this invention, the Masking Services Provider acts as a SaaS provider. An important aspect of extending masking services to application owner includes executing a SaaS agreement between the application owner and the Masking Services Provider. In various embodiments of the present invention, the SaaS agreement specifies details regarding type of subscription, subscription payment options, options for privacy law compliance requirements, data partitioning provisions etc. Upon receiving confirmation of provision of masking services, at step 110, the application owner integrates the one or more masking services with an appropriate application. In an embodiment of the present invention, a Masking Services Provider providing the masking service comprises a rules engine that generates a set of Application Programming Interfaces (API's). The API's are configured to communicate with middleware of external software systems and designate details regarding forms of data masking to be implemented. In exemplary embodiments of the present invention, when an application owner integrates the data masking service with an application, based on the type of application and subscription options selected by the application owner, one or more data masking rules corresponding to the application are set at the rules engine. For example, in various embodiments of the present invention, the system of the invention exposes one or more user interfaces to the application owner wherein the application owner can specify options related to implementation of data masking. Examples of options include, but are not limited to, amount of data to be masked for an application, number of times masking is to be performed when application is accessed etc. Further, the application is hosted on a local server. When application data is requested by an end user, based on the user credentials, either masked or unmasked data corresponding to the application is provided to the user.

In various embodiments of the present invention, the method of providing a data masking service subscription to a requesting application owner which are described herein, is implemented in software and is executed on one of the IT infrastructure components of the Masking Services Provider. The method may be implemented in the form of a source program, executable program (object code), script or any other entity comprising a set of instructions.

Figure 2:
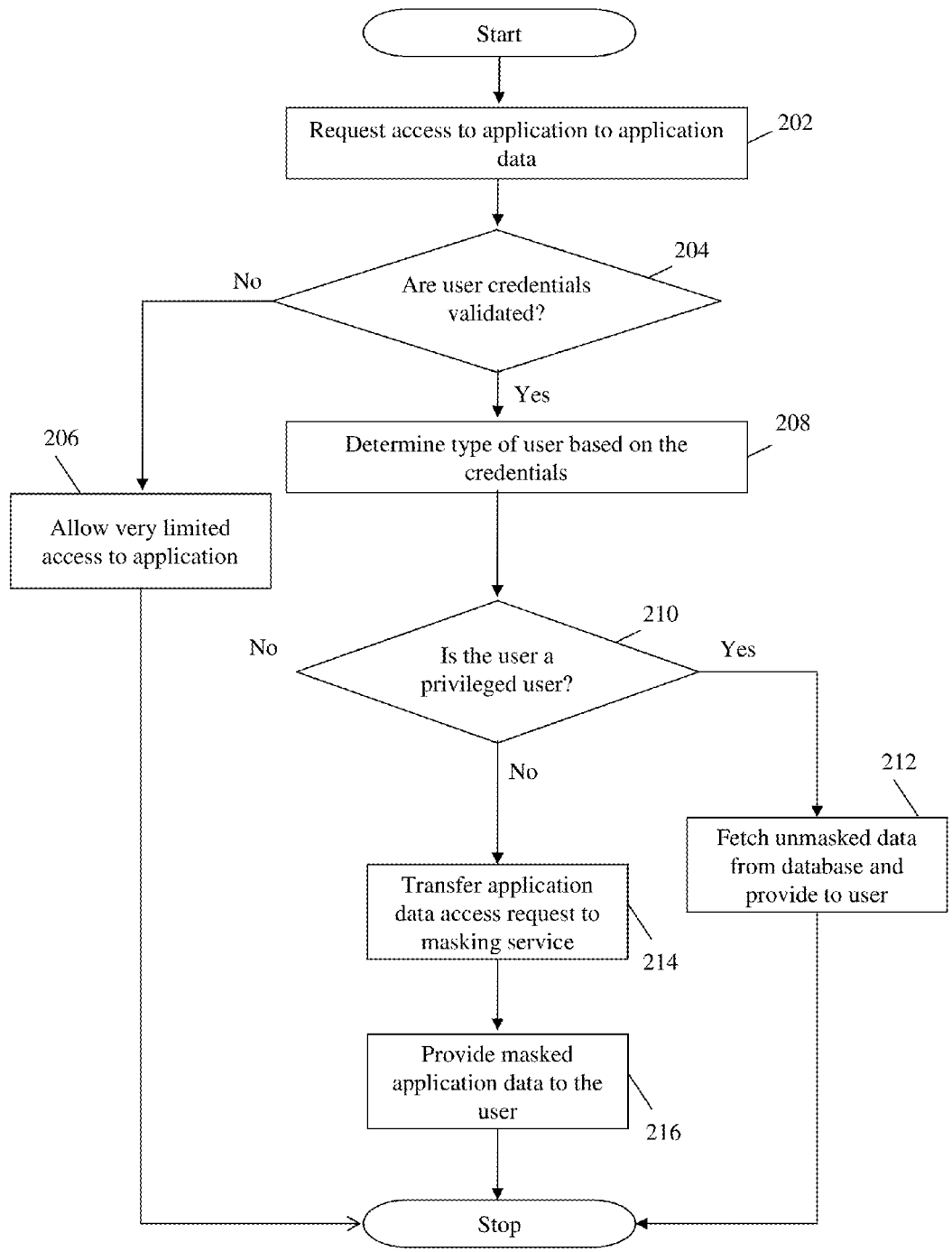
FIG. 2 is a flowchart illustrating a method for providing data associated with an application to a requesting user.

FIG. 2 is a flowchart illustrating a method for providing data associated with an application to a requesting user. In various embodiments of the present invention, data corresponding to an application hosted by a customer service organization may be requested by one or more end users. The end users may be customers of the organization or employees of internal departments within an organization that need access to the application for various purposes. Examples of the application may include a banking application, a customer service application, a social networking application, a gaming application, a business application, and the like. Since application data requested by end users may contain sensitive information, an application owner integrates data masking service offered by a Masking Services Provider with the application, as described with respect to FIG. 1. After integrating data masking service with the application, application data requested by an end user is processed by the application by accessing data masking service on demand.

The process steps involved in providing application data to a requesting user are as follows: At step 202, an end user puts in a request to a computing device hosting an application for access to application data. In an embodiment of the present invention, the computing device is part of a communication network of an organization providing one or more software applications to requesting users through one or more communication networks. In another embodiment of the present invention, the computing device may belong to an external vendor hosting the requested application on behalf of the organization and connected to the organization's communication network. At step 204, the application hosted on the computing device determines whether the user credentials are validated. Validation of user credentials includes determining whether the user is authorized to access the requested application. If it is determined at step 204 that the user is not authorized to access the requested application, then, at step 206, the user is provided with very limited access to application. Contrarily, if it is determined at step 204 that the user is authorized to access the requested application; the user is provided access to the on-demand masking service. Then, at step 208, type of user requesting access to the application is determined In exemplary embodiments of the present invention, the user may be a privileged user with authority to have unrestricted access to application data. At step 210, if it is determined that the user is a privileged user, at step 212, unmasked application data is fetched from a database by the application and provided to the user. However, if at step 210 it is determined that the user is not a privileged user, then at step 214 the application data request is transferred to a data masking service provided by a Masking Services Provider. The data masking service then fetches application data in a secure mode from the database. Following the fetching of application data, the data masking service performs the act of data masking based on pre-configured masking rules and masked data is then provided to the application. The application subsequently provides masked application data to the user at step 216.

In various embodiments of the present invention, the method of providing data associated with an application to a requesting user may be implemented in software and is executed on the computing device. The method may be implemented in the form of a source program, executable program (object code), script or any other entity comprising a set of instructions.

Figure 3:
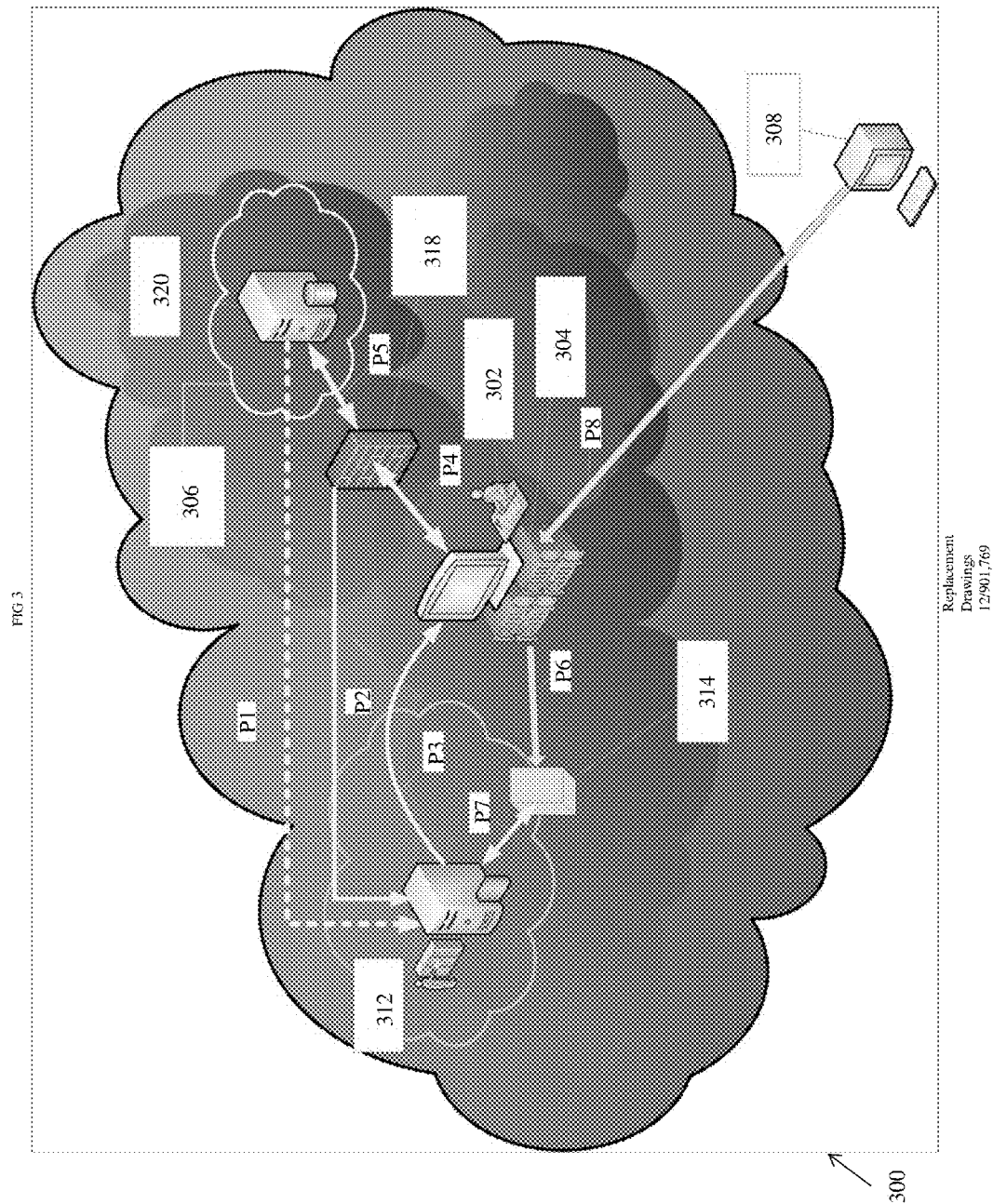
FIG. 3 illustrates block diagram of a system capable of providing application data on demand to a requesting user in masked or unmasked form, in accordance with an embodiment of the present invention.

FIG. 3 illustrates a block diagram of a system 300 capable of providing application data on demand to a requesting user in masked or unmasked form, in accordance with an embodiment of the present invention. A data masking architecture is shown, in which an application is hosted by an application owner 302 on a computing device. The computing device is an element of an organization which is a provider of one or more software applications to users. In exemplary embodiments of the present invention, an application 304 hosted by a computing device is accessed by multiple end users. Examples of applications include, but are not limited to, a banking application, a customer service application, a social networking application, a gaming application, a business application etc. An end user 308 may be a customer, a software program, an automated machine and the like. In an embodiment of the present invention, the computing device is a server that deals in providing access to the application on demand to a requesting end user. In another embodiment of the present invention, the computing device is a third party server connected to an Internet Protocol (IP) network of the organization through the Internet. In yet another embodiment of the present invention, the computing device may be a PC or a workstation.

The end user 308 may be coupled to the computing device through a communication network. The network can be an IP-based network for communication between the end user and the computing device through a broadband connection. The network may be implemented in a wireless fashion e.g. using wireless protocols and technologies, such as, WiFi, WiMax etc or any combination thereof. In some embodiments, the network can also be a packet switched network such as a local area network, wide area network, metropolitan area network, Internet network, or any other similar type of network environment including equipment for receiving and transmitting signals.

The application owner 302 subscribes to real time data masking service provided by a Masking Services Provider 312. The Masking Services Provider 312 is a SaaS provider, an enterprise that provides one or more executable data masking applications on demand. Additionally, the Masking Services Provider 312 extends technical infrastructure, computing power and computer storage necessary to execute the masking services. In an embodiment of the present invention, the Masking Services Provider 312 is a distributed computing or a cloud computing software platform comprising IT infrastructure components for maintaining and offering data masking services to multiple requesting applications. IT infrastructure components include Data Centers comprising computing equipment dedicated for running multiple data masking applications. Examples of computing equipment include, but are not limited to, Application Servers, File servers, Routers, Switches, Database Servers, Network Security elements such as VPN gateways, Firewalls, Intrusion Detection Systems etc. In exemplary embodiments of the present invention, the Masking Services Provider 312 employs multiple application servers networked with each other in a grid computing arrangement, wherein the multiple application servers are configured to execute multiple instances of data masking algorithms. Based on subscription options chosen by the application owner 302, the Masking Services Provider 312 activates one or more servers to execute the one or more data masking applications. In various embodiments of the present invention, the application owner 302 subscribes to the one or more data masking applications through a subscription module 314 via path P6. The subscription module 314 is a software module that manages the subscription of multiple users. In some embodiments of the present invention, the subscription module 314 is incorporated as an element of the Masking Services Provider 312. In other embodiments of the present invention, the subscription module is an independent software module operationally connected to the Masking Services Provider 312 and the computing device hosting the application 304 through one or more communication networks. The subscription module 314 manages and processes records of multiple subscribers subscribing to data masking services. Record of a subscriber includes, but not limited to, type of subscription, subscription renewal options, subscription payment options etc. Examples of type of subscription may include yearly, half-yearly, quarterly etc. Further, the subscription module 314 is configured to receive electronic payments received by subscribers using secure protocols such as Transport Layer Security (TLS), Secure Socket Layer (SSL) etc. The application owner 302 is able to configure software masking rules according to requirements. In certain embodiments of the present invention, API's exposed by the Masking Services Provider 312 are configured to accept calls from a web browser at the application owner 302. For example, the web browser can present configuration screens by which the application owner 302 can create configuration data.

In accordance with an implementation of the invention, the subscription module 314 presents one or more user interfaces to the application owner 302 for inputting subscription details. Subsequently, subscription details are processed and shared with the Masking Services Provider 312 through the path P7 for stipulating rules for providing data masking service. In various embodiments of the present invention, the Masking Services Provider 312 comprises a rules engine, which is a software module storing software instructions for implementing data masking rules. The masking rules are triggered in accordance with subscription details specified by the application owner 302. Examples of masking rules include, but are not limited to, number of digits in application data to be masked, masking data for specific categories of user, number of times masking to be implemented for certain applications, increasing masking frequency based on application usage etc. In various embodiments of the present invention, masking rules stored in the rules engine are updated frequently based on new requirements by application owners. Further, based on subscription details, the subscription module 314 presents a SaaS agreement to the application owner 302 that needs to be executed.

In an embodiment of the present invention, the Masking Services Provider 312 executes multiple data masking applications, wherein a single instance of a data masking application is executed on a distinct server according to a specific rule. In order to execute the data masking application for multiple users, a multi-tenant architecture is implemented, where the application is capable of virtually replicating and configuring itself based on requirements of each subscriber. In another embodiment of the present invention, a single instance of a data masking application is implemented on multiple servers in a parallel computing environment. In such an environment, tasks for implementing the application are shared among multiple processors.

For the purpose of executing data masking applications, the Masking Services Provider 312 is configured to employ one or more API's in order to communicate with external applications. Once the application owner 302 subscribes to a data masking service corresponding to one or more specific rules, the data masking service is integrated with one or more applications hosted by the computing device. Integrating the data masking service with an application includes incorporating critical aspects of the data masking service with the application. In an example, one or more API's for configuring software rules are integrated with one or more applications. Consequently, software rules corresponding to the data masking service are fetched through a resource adapter (not shown in the figure) into the one or more applications. In other embodiments of the present invention, API's are configured to accept calls from other interfaces at the application owner 302. Thus, the application owner 302 is provided with means to directly access the data masking service so as to customize the data masking service according to its needs.

In various embodiments of the present invention, the method and system of the present invention provides capabilities for executing data masking services for heterogeneous software environments. The end user 308 may be a part of a software environment that is different from the environment hosting the Masking Services Provider 312. The end user 308 may be part of different technology platform types such as UNIX-based systems, mainframes, microcomputer-based systems etc. In order to facilitate interchangeability of configuration data, exchange of configuration data is realized using Extensible Markup Language (XML) tools such as XML editors and XML metadata tools.

Following integration of data masking service with an application, in various embodiments of the present invention, software in the computing device associated with the application is also configured to perform tasks associated with configuring masking rules. The software includes API's configured to invoke functionality of the data masking service for configuration of software rules. Based on the data masking rules stipulated at the application end by the application owner 302, the Masking Services Provider 312 executes data masking algorithms on demand and provides masked data to the application. Data associated with the application is then subsequently transmitted to the end user 308 based on the configured data masking rules. In an exemplary embodiment of the present invention, the end user 308 is a customer requesting access to the application 304 hosted by the computing device through path P8. Accessing the application 304 may include presenting electronic forms on a web interface for performing banking transactions. When the end user 308 enters personal details in an electronic form, data in subsequent web pages transmitted to the end user 308 are masked and the web pages are thereby provisioned to the end user 308.

In various embodiments of the present invention, when the end user 308 requests for an application, it transmits credentials along with the application request to the computing device. Examples of credentials include username, password, IP address of request originating computer etc. The application passes the credentials to a credential check module 318 through path P4. The credential check module 318 validates the credentials of the end user 308. Validation of credentials includes determining category of the end user 308. In an embodiment of the present invention, if the end user 308 is a privileged user, the credential check module 318 provides the end user with unrestricted access to application data. Data corresponding to the application is fetched from a Database utility 320 by the credential check module 318 through path PS and is provided to the application. The Database utility 320 comprises a database server and other storage modules configured to store application data. In another embodiment of the present invention, if the end user 308 is not a privileged user, the credential check module 318 transfers the application data request to the Masking Services Provider 312 through path P2. The end user 308 is provided with masked data according to the pre-configured data masking rules at the Masking Services Provider 312. For the purpose of providing application data in a secure form to an unprivileged user, application data is fetched from the Database utility by the Masking Services Provider 312 through path P1. Fetched application data is then masked by the Masking Services Provider 312 and delivered to the application 304 through path P3. The application 304 subsequently transmits the masked data to the end user 308.

In various embodiments of the present invention, the Masking Services Provider 312 and the Database Utility 320 operate as Cloud Environments 306 accessible by computing device hosting the application 304 in real time.

The method and system for providing data masking services as described in the present invention or any of its embodiments, may be realized in the form of a computer system. Typical examples of a computer system include a general-purpose computer, a programmed microprocessor, a micro-controller, a peripheral integrated circuit element, and other devices or arrangement of devices that are capable of implementing the steps that constitute the method of the present invention.

The computer system typically comprises a computer, an input device, and a display unit. The computer typically comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements to process input data. The storage elements may also hold data or other information, as desired, and may be an information source or physical memory element present in the processing machine. The set of instructions may include various commands that instruct the processing machine to execute specific tasks such as the steps constituting the method of the present invention.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for providing application data to a user device requesting data from an application hosted on an application server, wherein the user device is connected to the application server through a communication network, the method comprising:
   receiving at the application server hosting the application, an application data request from the user device, the application data request comprising a request for application data from the application hosted on said application server;
   validating credentials of a user requesting the application data, wherein validation is performed to determine whether the user is authorized to access the requested application data;
   determining type of user based on the user credentials;
   responsive to determining that the user is not a privileged user:
      transferring the application data request from the application server hosting the application to a masking server;
      communicating the requested application data from a database utility to the masking server;
      masking the application data received at the masking server, based on pre-configured masking rules, and
      communicating the masked application data from the masking server to the application server hosting the application from which application data has been requested by the user device over the communication network; and
      communicating the masked application data from the application server hosting the application from which application data has been requested by the user device over the communication network, to the user device.

2. The method of claim 1, wherein masking rules are configured by an application owner managing the application, further wherein configuration of masking rules is performed by integrating subscribed data masking service with the application after subscribing to the data masking service by the application owner.

3. The method of claim 2, wherein configuring masking rules comprises specifying data masking options such as specifying data to be masked for an application and type of masking to be performed.

4. The method of claim 2, wherein subscribing to data masking service comprises executing Software as a Service agreement between the application owner and the masking services provider.

5. The method of claim 1, wherein the user comprises at least one of a human user, a software program and an automated machine.

6. The method of claim 1 further comprises providing the user with limited access to application if user credentials are not validated.

7. The method of claim 1, wherein the application hosted by the application server, masking service provided by the masking server and storage services provided by the database utility are implemented on independent software environments connected through one or more communication networks.

8. A method of providing data masking as a software service, the method comprising:
   receiving request for subscription to data masking service from an application owner hosting a software application;
   authenticating credentials of the application owner;
   facilitating configuration of one or more masking rules corresponding to the software application;
   receiving at an application server hosting the software application, an application data request from a user device, wherein the application data request comprises a request for application data from the software application; and
   transmitting a request for performing data masking from the application server hosting the software application to a data masking server;
   communicating the requested application data from a database utility associated with the software application, to the data masking server;
   executing at the data masking server, one or more data masking algorithms for masking the requested application data according to the one or more masking rules;
   transmitting masked data from the data masking service to the application server hosting the software application from which application data has been requested by the user device over the communicating network; and
   transmitting the masked data from the application server hosting the software application from which application data has been requested by the user device over the communication network, to the user device.

9. The method of claim 8, wherein facilitating configuration of one or more masking rules comprises providing a set of user interfaces to the application owner for specifying options for configuring masking rules.

10. The method of claim 8, wherein the one or more data masking algorithms comprises algorithms for masking at least one of alphabetical data, numerical data, data comprising combination of alphabets and numerals, data comprising unique codes or any combination thereof.

11. The method of claim 8, wherein the masking service is implemented in the form of a source program.

12. The method of claim 8, wherein the masking service is implemented in the form of an object program.

13. A system for provisioning application data in a secure form, the system comprising:
   an application server hosting a software application and configured to:
      operationally connect to a user device through a communication network; and
      receive an application data request from a user through the user device, the application data request comprising a request for application data from the software application hosted on the application server;
   a credential check module configured to validate credentials of the user requesting the application data;
   a subscription module configured to manage subscription of the software application to a data masking service;
   a masking server operationally connected to the application server hosting the software application and configured to:
      receive the application data request from the application server hosting the software application;
      receive the requested application data from a database utility;
      perform masking of the requested application data based on pre-configured masking rules; and
   communicate the masked application data to the application server hosting the software application from which application data has been requested by the user device over the communication network, for onward transmission to the user device.

14. The system of claim 13, wherein the application server is part of a software vendor configured to provide one or more applications and to host the software application, further wherein the software vendor is internal or external to the organization.

15. The system of claim 13, wherein the subscription module is incorporated as part of the masking server.

16. The system of claim 13, wherein validating user credentials comprises determining whether a user is authorized to access the software application.

17. The system of claim 13, wherein the credential check module is further configured to determine category of user.

18. The system of claim 17, wherein the credential check module is further configured to transfer the application data request to masking services provider only if the user is determined to be an unprivileged user.

19. The system of claim 13, wherein the credential check module is further configured to fetch the requested application data from the database utility and provide the application data to the application server, if the user is determined to be a privileged user.

20. The system of claim 13, wherein the masking server comprises:
   one or more servers configured to execute multiple instances of data masking algorithms; and
   a rules engine configured to store software instructions for implementing data masking rules during execution of data masking process.

21. The system of claim 20, wherein the masking services provider regularly updates masking rules based on requirements by application owners.

22. A computer program product comprising a non-transitory computer usable medium having a computer readable program code embodied therein for providing application data to a user device requesting an application hosted on an application server, wherein the user device is connected to the application server through a communication network, the computer program product comprising:
   program instructions for receiving at the application server hosting the application, an application data access request from the user device, the application data request comprising a request for application data from the application hosted on said application server;
   program instructions for validating credentials of a user requesting the application data;
   program instructions for determining type of user based on the user credentials;
   program instructions for responding to determining that the user is not a privileged user by: transferring the application data request from the application server hosting the application to a masking server;
   communicating the requested application data from a database utility to the masking server;
   masking the application data received at the masking server based on pre-configured masking rules; and
   communicating the masked application data from the masking server to the application server hosting the application from which application data has been requested by the user device over the communication network; and
   program instructions for communicating the masked application data from the application server hosting the application from which application data has been requested by the user device over the communication network, to the user device.

23. The computer program product of claim 22, further comprising program instructions for executing Software as a Service agreement between an application owner and a masking services provider.

24. The computer program product of claim 22 further comprising program instructions for providing the user device with limited access to application data if user credentials are not validated.

25. The computer product of claim 22, further comprising:
   program instructions for receiving request for subscription to data masking service from an application owner hosting a software application;
   program instructions for authenticating credentials of the application owner;
   program instructions for facilitating configuration of one or more masking rules corresponding to the software application;
   program instructions for receiving request for performing data masking on data associated with the software application; and
   program instructions for executing one or more data masking algorithms for performing data masking according to the one or more masking rules.

26. The computer program product of claim 25, wherein the step of facilitating configuration of one or more masking rules comprises program instructions for providing a set of user interfaces to the application owner for specifying options for configuring masking rules.

* * * * *